United States Patent
Kobayashi et al.

(10) Patent No.: US 11,351,948 B2
(45) Date of Patent: Jun. 7, 2022

(54) SIDE AIRBAG DEVICE AND VEHICLE SEAT PROVIDED WITH SAME

(71) Applicant: Autoliv Development AB, Vargarda (SE)

(72) Inventors: Yuto Kobayashi, Kanagawa (JP); Hiroyuki Shima, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 17/044,055

(22) PCT Filed: Mar. 20, 2019

(86) PCT No.: PCT/JP2019/011890
§ 371 (c)(1),
(2) Date: Sep. 30, 2020

(87) PCT Pub. No.: WO2019/193984
PCT Pub. Date: Oct. 10, 2019

(65) Prior Publication Data
US 2021/0046895 A1    Feb. 18, 2021

(30) Foreign Application Priority Data

Apr. 5, 2018 (JP) .............................. JP2018-073437
Jun. 26, 2018 (JP) .............................. JP2018-121007

(51) Int. Cl.
*B60R 21/231* (2011.01)
*B60R 21/207* (2006.01)
(Continued)

(52) U.S. Cl.
CPC .......... *B60R 21/23138* (2013.01); *B60N 2/64* (2013.01); *B60N 2/68* (2013.01);
(Continued)

(58) Field of Classification Search
None
See application file for complete search history.

(56) References Cited

U.S. PATENT DOCUMENTS 9,751,487 B2 *   9/2017   Sendelbach ....... B60R 21/23138
2009/0020988 A1   1/2009   Sato et al.
(Continued)

FOREIGN PATENT DOCUMENTS

CN    103661045 A  *  3/2014   ....... B60R 21/23138
CN    104590195 A  *  5/2015   ............. B60N 2/427
(Continued)

OTHER PUBLICATIONS

International Search Report of the International Searching Authority for PCT/JP2019/011890 dated May 14, 2019.
(Continued)

*Primary Examiner* — Faye M Fleming
(74) *Attorney, Agent, or Firm* — Harness, Dickey & Pierce, P.L.C.; Stephen T. Olson

(57) ABSTRACT

[Problem]
To provide: a side airbag device capable of quickly and properly restraining a passenger in the initial stage of deploying an airbag; and a vehicle seat provided with the side airbag device.
[Resolution Means]
A side airbag device is provided with: an airbag disposed inside a side supporting part of a seat, that restrains an occupant by expanding and deploying in the event of a vehicle collision; and an inflator that supplies an expansion gas to the airbag. Furthermore, the airbag is folded and stored in the side supporting part in an extended condition such that the vertical direction is the longitudinal direction. Furthermore, a lower part of the airbag in the stored condition is folded a plurality of times in the longitudinal direction to form a lower compressed part.

19 Claims, 16 Drawing Sheets

(51) Int. Cl.
  *B60N 2/64* (2006.01)
  *B60N 2/68* (2006.01)
  *B60R 21/217* (2011.01)
  *B60R 21/233* (2006.01)
  *B60R 21/237* (2006.01)
  *B60R 21/26* (2011.01)

(52) U.S. Cl.
  CPC ........ *B60R 21/207* (2013.01); *B60R 21/2176* (2013.01); *B60R 21/233* (2013.01); *B60R 21/237* (2013.01); *B60R 21/26* (2013.01); *B60R 2021/23146* (2013.01)

(56) References Cited

U.S. PATENT DOCUMENTS

| | | |
|---|---|---|
| 2009/0206585 A1 | 8/2009 | Honda |
| 2010/0237595 A1 | 9/2010 | Fukuyama et al. |
| 2017/0028962 A1 | 2/2017 | Goto et al. |
| 2018/0186326 A1 | 7/2018 | Kobayashi et al. |

FOREIGN PATENT DOCUMENTS

| | | | | |
|---|---|---|---|---|
| CN | 107891834 A | * | 4/2018 | ....... B60R 21/23138 |
| DE | 102012224178 A1 | * | 3/2013 | ........... B60R 21/207 |
| DE | 102014008599 A1 | * | 12/2014 | ........... B60R 21/237 |
| JP | H9-240411 A | | 9/1997 | |
| JP | H9-290702 A | | 11/1997 | |
| JP | 2009-23494 A | | 2/2009 | |
| JP | 2009-190678 A | | 8/2009 | |
| JP | 2010-221736 A | | 10/2010 | |
| JP | 2016-22872 A | | 2/2016 | |
| JP | 2017-30510 A | | 2/2017 | |
| WO | 2017/010169 A1 | | 1/2017 | |

OTHER PUBLICATIONS

English translation of International Search Report of the International Searching Authority for PCT/JP2019/011890 dated May 14, 2019.

* cited by examiner

FIG. 3
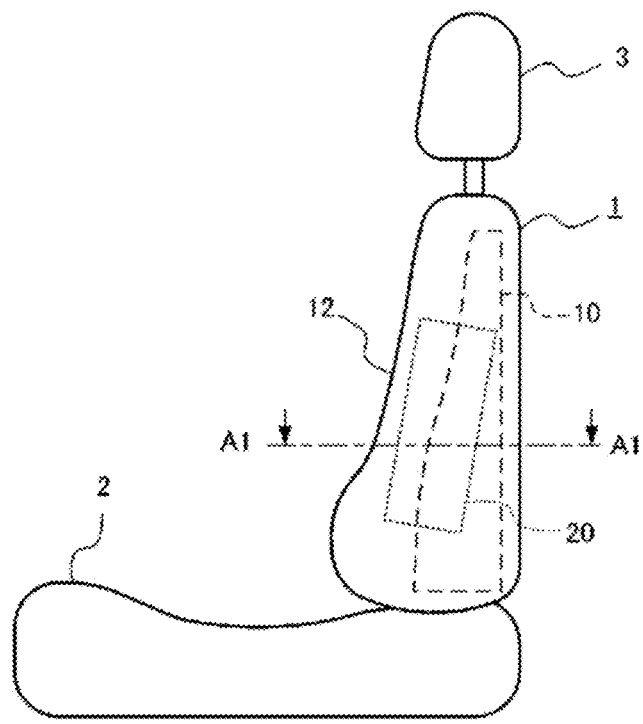
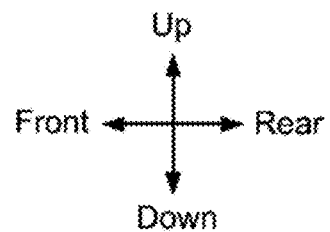

A1-A1 cross section

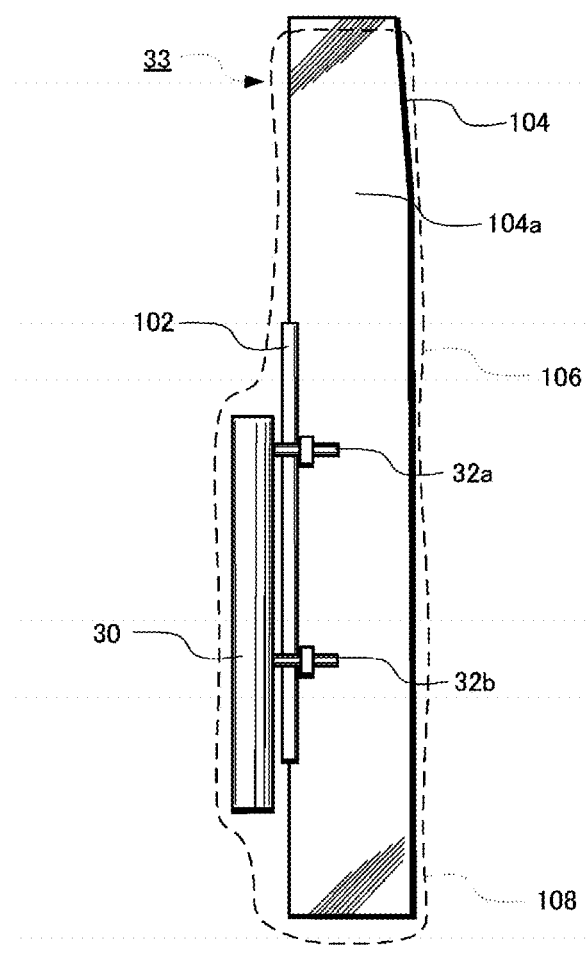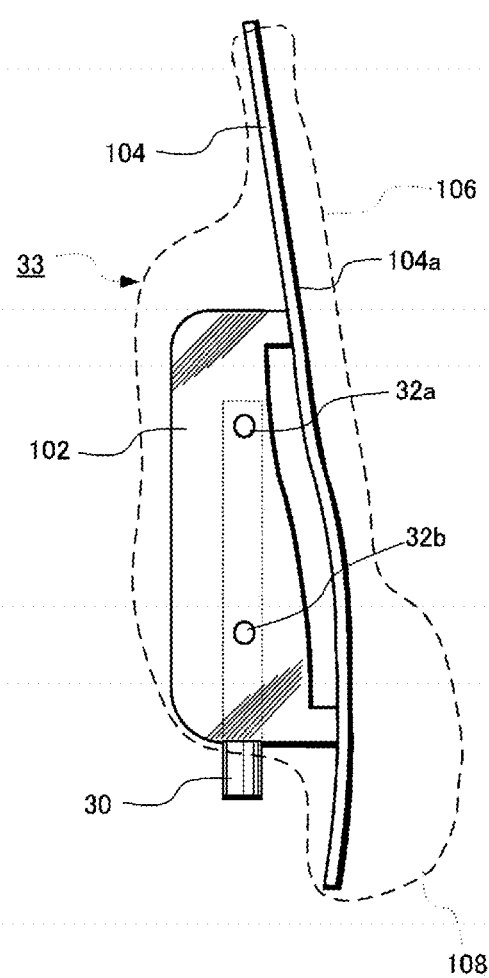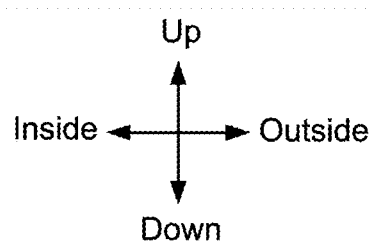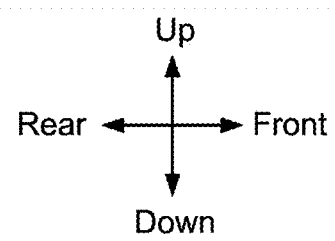

FIG. 7A
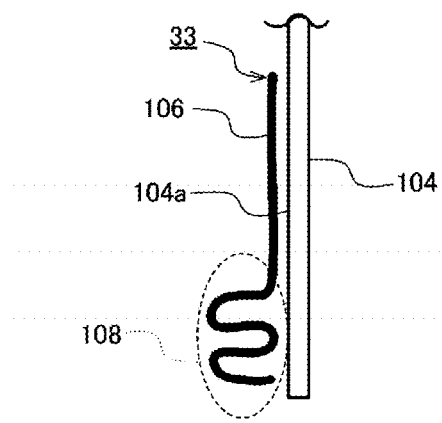
FIG. 7B
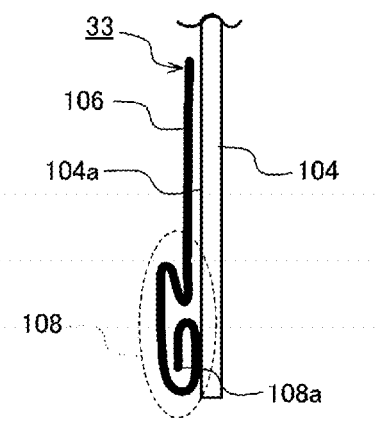
FIG. 7C
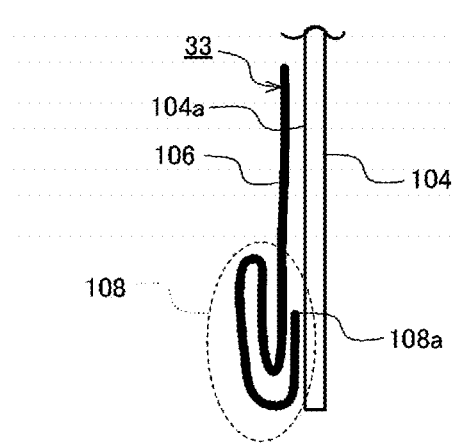
FIG. 7D
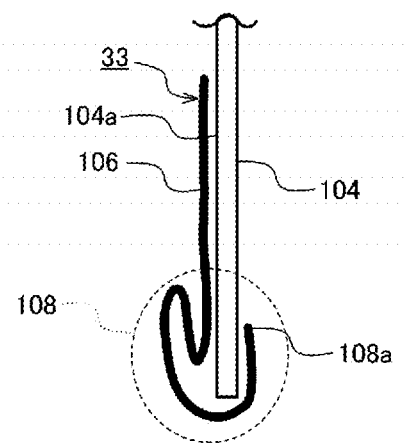
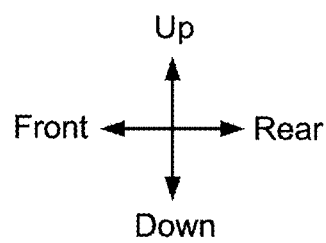

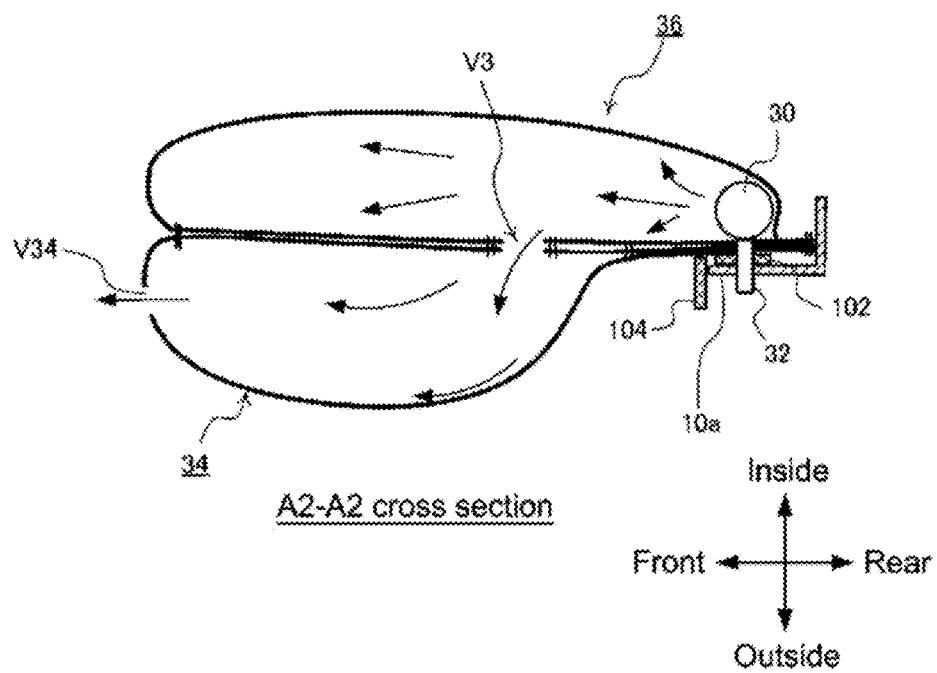
FIG. 9A  Example 1
A2-A2 cross section
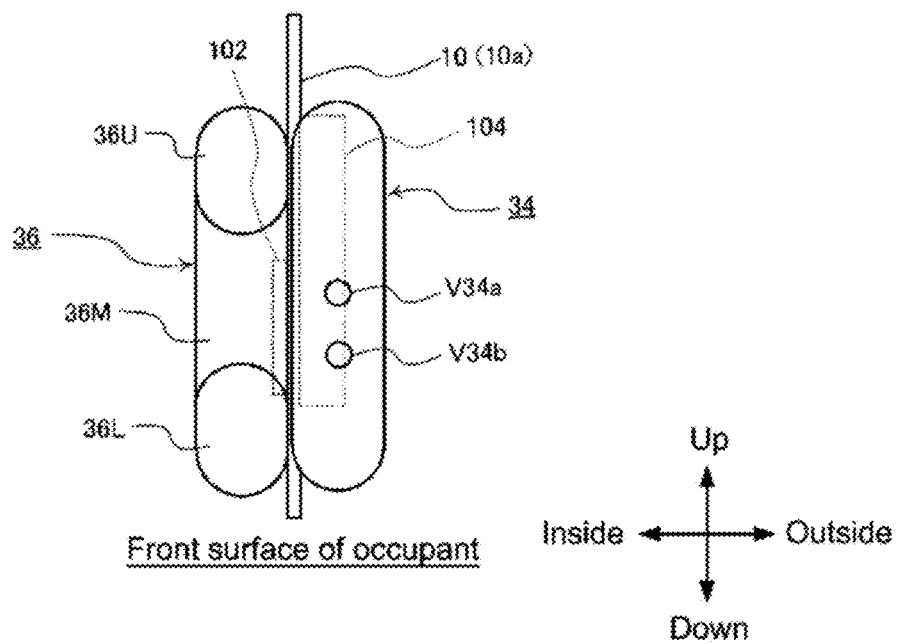
FIG. 9B
Front surface of occupant

SIDE AIRBAG DEVICE AND VEHICLE SEAT PROVIDED WITH SAME

TECHNICAL FIELD

The present invention relates to a vehicle seat and a side airbag device provided in the seat.

BACKGROUND

In order to protect an occupant in the event of a vehicle accident, it is well known that vehicles are equipped with one or a plurality of airbags. These airbags include, for example, various forms such as: a so-called driver airbag which expands from near the center of the steering wheel of an automobile so as to protect a driver; a curtain airbag which deploys downward along an inner side of a window of the automobile so as to protect passengers during collisions in a transverse direction of the vehicle, as well as when overturning and during rollover accidents; and a side airbag which is deployed between the passenger and a side panel so as to protect the passenger upon impact in the transverse direction of the vehicle. The present invention relates to a side airbag device and a vehicle seat provided with same.

The side airbag device described in the below mentioned Patent Document 1 includes a main airbag along with an auxiliary airbag. In addition, prior to the main airbag, the auxiliary airbag is expanded and deployed to restrain occupants at an early stage. In addition to the invention described in Patent Document 1, a side airbag device including the auxiliary airbag as well as the main airbag is proposed.

Herein, the side airbag device is stored in a side supporting part of a seat. Therefore, there are many restrictions on the shape and size, and thus the airbag device must be stored compactly. However, by making the airbag compact, a problem occurs where the deployment behavior of the airbag is adversely affected.

RELATED ART DOCUMENTS

Patent Documents

Patent Document 1: Japanese Unexamined Patent Application Publication No. 2009-023494

SUMMARY OF THE INVENTION

Problem to be Solved by the Invention

In view of the foregoing, an object of the present invention is to provide: a side airbag device capable of quickly and properly restraining an occupant; and a vehicle seat provided therewith.

Furthermore, another object is to provide: a side airbag device that contributes to downsizing of the device; and a vehicle seat provided therewith.

Means for Solving the Problem

In order to solve the aforementioned problem, the present invention provides a novel side airbag device provided in a vehicle seat having a seat cushion forming a seat surface, a seat back forming a backrest, and a side supporting part that expands in a vehicle traveling direction (toward the vehicle front) on a side part in the vehicle width direction (edge part).

A side airbag device according to the present invention is provided with: an airbag disposed inside the side supporting part, that restrains an occupant by expanding and deploying in the event of a vehicle collision; and an inflator that supplies an expansion gas to the airbag. Furthermore, the airbag is folded and stored in the side supporting part in an extended condition such that the vertical direction is the longitudinal direction. Furthermore, a lower part of the airbag in the stored condition is folded a plurality of times in the longitudinal direction to form a lower compressed part. Note that "folded" includes cases where the airbag is rolled into a roll shape in addition to being folded into a bellows shape.

In the specification, claims, and drawings, the directions shall be defined as follows. When an occupant is seated in a normal seating posture such that a large portion of the back of the passenger contacts the seat back, the direction that the torso of the passenger faces shall be referred to as "front", and an opposite direction thereof shall be referred to as "rear". Furthermore, a right-hand direction of the occupant shall be referred to as "right", and a left-hand direction shall be referred to as "left", which are directions orthogonal to the front-rear direction. In the left-right direction, a region on an occupant side from a side frame of the seat shall be referred to as "inside", and a region opposite from the occupant as viewed from the side frame shall be referred to as "outside". Furthermore, "vertical direction" not only includes an exactly vertical direction, but also a slightly inclined form along the side supporting part or the seat frame.

According to the present invention with the configuration described above, length in the vertical direction of the airbag required for restraining an occupant can be ensured, and compact storing as a whole, and particularly compact storing in the vertical direction is possible.

Furthermore, the airbag in the stored condition can quickly deploy at an upper end portion, in other words, a shoulder area of an occupant seated in the seat, before a lower compressed part, and thus it is possible to quickly ensure an appropriate deployment shape.

Now, a lower portion of the side supporting part of the vehicle seat extends further forward than an upper portion, and the thickness of urethane inside (commonly known as "anko") often increases. In this case, the capacity of the airbag in that portion must be increased to increase pressure in order to break through the lower portion of the side supporting part and deploy the airbag. In this regard, in the present invention, the presence of the lower compressed part enables the side support part to be reliably broken by a large pressure from the inside at the lower part of the airbag, and thus a waist area of the occupant can be appropriately restrained.

In the present invention, a bracket that secures the inflator to a seat frame side wall part inside the side supporting part can be further provided. At this time, the bracket preferably is a structure including a long plate part extending such that the vertical direction is the longitudinal direction. Furthermore, the airbag can be disposed along the long plate part in a folded stored condition, and the lower compressed part can be formed by a lower part of the airbag protruding from a lower end of the long plate part.

A thin and long airbag is disposed along the long plate part of the bracket. Therefore, a flexible airbag is supported by the plate, and posture and form of the airbag in a stored condition is stabilized without unnecessary bending. On the other hand, the lower compressed part of the airbag is formed using a portion that protrudes below the long plate part. Therefore, when the airbag is actually deployed, the airbag deploys further downward than the long plate part, and thus the occupant can be restrained over a wider range in the vertical direction. In other words, length in the vertical direction of the long plate part of the bracket can be minimized to ensure the length required in the vertical direction of the airbag during deployment.

The long plate part can have a first surface facing the vehicle traveling direction, and the airbag in the folded condition can be disposed along the first surface in a stored condition. In this case, when the long and thin compressed airbag expands and deploys in the vehicle traveling direction, the first surface of the long plate part is a reaction force surface, and thus the airbag reliably and quickly deploys in a forward direction.

A first method of forming the lower compressed part of the airbag can be a method of folding the lower part of the folded airbag into a bellows shape, in a condition where the airbag is stored. In this case, in addition to the lower compressed part being easy to form (fold), there is an advantage that there is not a portion that gets caught when the lower compressed part deploys, thereby enabling smooth deployment.

A second method of forming the lower compressed part of the airbag can be a method of folding a lower part of the folded airbag into a Z shape, folding a lower end of the airbag upward, and rolling and wrapping a tip end part inside the Z-shaped fold, when viewed in a vehicle front-rear direction and on a cross section extending in the longitudinal direction of the airbag, in a condition where the airbag is stored. In this case, the Z-folded portion in the lower compressed part first deploys downward, followed by deployment of the wrapped portion of the tip end.

A third method of forming the lower compressed part of the airbag can be a method of folding a lower part of the folded airbag into a Z shape, and sandwiching a tip end part of a lower end of the airbag between a boundary portion between the long plate part and folded airbag, when viewed in the vehicle front-rear direction and on the cross section extending in the longitudinal direction of the airbag, in a condition where the airbag is stored. In this case, the Z-folded portion in the lower compressed part first deploys downward, followed by deployment of the wrapped portion of the tip end.

A fourth method of forming the lower compressed part of the airbag can be a method of folding a lower part of the folded airbag into a Z shape, and passing a tip end portion of a lower end of the airbag over a lower end of the long plate part and wrapping around a surface on a back side of the first surface of the long plate part, when viewed in the vehicle front-rear direction and on the cross section extending in the longitudinal direction of the airbag, in a condition where the airbag is stored. In this case, the Z-folded portion in the lower compressed part first deploys downward, followed by deployment of the tip end portion. With this method, a lowermost end of the airbag is wrapped around to a back side of the bracket such that a thickness of a front portion of the airbag positioned on the first surface of the long plate part can be reduced.

The bracket can be configured to include an inflator retaining plate that is directly secured to the seat frame side wall part, through which a stud bolt of the inflator penetrates, in addition to the long plate part.

The airbag can be provided with: a first chamber that deploys toward the front of the side supporting part; and a second chamber that stores the inflator and begins to deploy prior to the first chamber, provided on the inside of the first chamber in the vehicle width direction.

In this case, in an initial stage of activation of the airbag device, the second chamber deploys inside the side supporting part, and thus an occupant can be quickly restrained from moving outward in the vehicle width direction.

Note that a third chamber can be further included in addition to the first and second chambers. The third chamber can be a structure fluidly connected to the first chamber and/or second chamber.

The side airbag device according to the present invention can further be provided with a soft cover that contains a soft sheet-like material and encloses the airbag and inflator. The soft cover preferably has a first slit through which a protruding portion of the bracket penetrates. When the airbag or the like is enclosed by the soft cover, insertion of the protruding portion of the bracket in the slit eliminates unnecessary spaces formed between the soft cover and the airbag and between the soft cover and the bracket, and thus a fitted condition is achieved.

The first slit can be formed such that the inflator retaining plate is penetrated. This is particularly effective when the long plate part and inflator retaining plate generally extend in an orthogonal direction, in a cross section in a direction orthogonal to the longitudinal direction of the long plate part.

The soft cover can be provided with a bag-like compartment that stores the longer plate part and the airbag, and the first slit can be formed in a portion of the main compartment. Storing an airbag with the largest volume and the long plate part in the main compartment facilitates enclosure by the soft cover.

Furthermore, holes through which two of the stud bolts penetrate can be formed in the soft cover, and a second slit can be formed between the two holes. By forming the second slit, a cover material can be divided into two halves by this portion, and a through-hole portion can easily hook onto the stud bolt, for example.

A vehicle seat according to the present invention has: a seat cushion forming a seat surface; a seat back forming a backrest; a side supporting part that swells in a vehicle traveling direction (vehicle front) on a side part in the vehicle width direction (edge part) of the seat back. Furthermore, a seat frame provided inside the side supporting part as well as a side airbag device secured to the seat frame in the side supporting part are provided. The side airbag device includes: an airbag that primarily deploys forward from the side supporting part in the event of a vehicle collision; an inflator that supplies expansion gas to the airbag; and a bracket secured to the seat frame in a condition that retains the airbag. The airbag is retained against the bracket in an extended condition such that the vertical direction is the longitudinal direction. Furthermore, a lower part of the airbag in the stored condition is folded a plurality of times in the longitudinal direction such that a lower compressed part that is thicker than other portions is formed. The bracket is provided with a recess formed in an extended long shape such that the vertical direction is the longitudinal direction, and recessed in the seat frame side to store the lower compressed part of the airbag. A notched region that receives the recess of the bracket is formed on the seat frame. Furthermore, the airbag is disposed along the long plate part of the bracket in the folded stored condition, and is configured such that the lower compressed part is stored in the recess.

According to the vehicle seat with the configuration described above, the folded airbag can be neatly retained and stored inside the side supporting part. Thus, the structure of the side supporting part of the seat can be simplified, thereby reducing manufacturing cost. For example, the shape of a urethane pad that encloses an airbag device can be simplified, thereby reducing the molding cost of the pad itself and simplifying the process of installing the pad.

Note that the side airbag device according to the present invention includes a type which is deployed on a door side (outer side) of the seat, and a type which is deployed on a vehicle center side of the seat. A side airbag device of a type which is deployed on the vehicle center side of the seat, for example, is referred to as a far side airbag, front center airbag, rear center airbag, and the like.

BRIEF DESCRIPTION OF THE DRAWINGS

FIG. 3 is a schematic side surface view of the vehicle seat according to the present invention, illustrating a condition where the side airbag device is stored therein, observed from the outside in the vehicle width direction.

FIG. 5 illustrates a condition (A) where the side airbag device according to the present invention is stored as viewed from the rear, and a condition (B) as viewed from the outside (door side) in a seat width direction, respectively.

FIGS. 7(A), (B), (C), (D) are schematic views illustrating folded forms of the airbag cushion used in side airbag device according to the present invention.

FIG. 9 illustrates a structure of the side airbag device according to the present invention, where (A) is a schematic view illustrating a deployed condition of the airbag corresponding to a cross section of FIG. 8 in an A2-A2 direction, and (B) is a front surface view illustrating the deployed condition of the airbag.

DESCRIPTION OF THE PREFERRED EMBODIMENT

The vehicle seat with the side airbag device according to the embodiments of the present invention mounted thereon will be described with reference to the accompanying drawings. Note that when an occupant is seated in a normal seating posture such that a large portion of the back of the passenger contacts the seat back, a direction that the torso of the passenger faces shall be referred to as "front", and an opposite direction thereof shall be referred to as "rear". Furthermore, a right-hand direction of the occupant shall be referred to as "right", and a left-hand direction shall be referred to as "left", which are directions orthogonal to the front-rear direction. In the left-right direction, a region on an occupant side from a side frame of the seat shall be referred to as "inside", and a region opposite from the occupant as viewed from the side frame shall be referred to as "outside".

Figure 1:
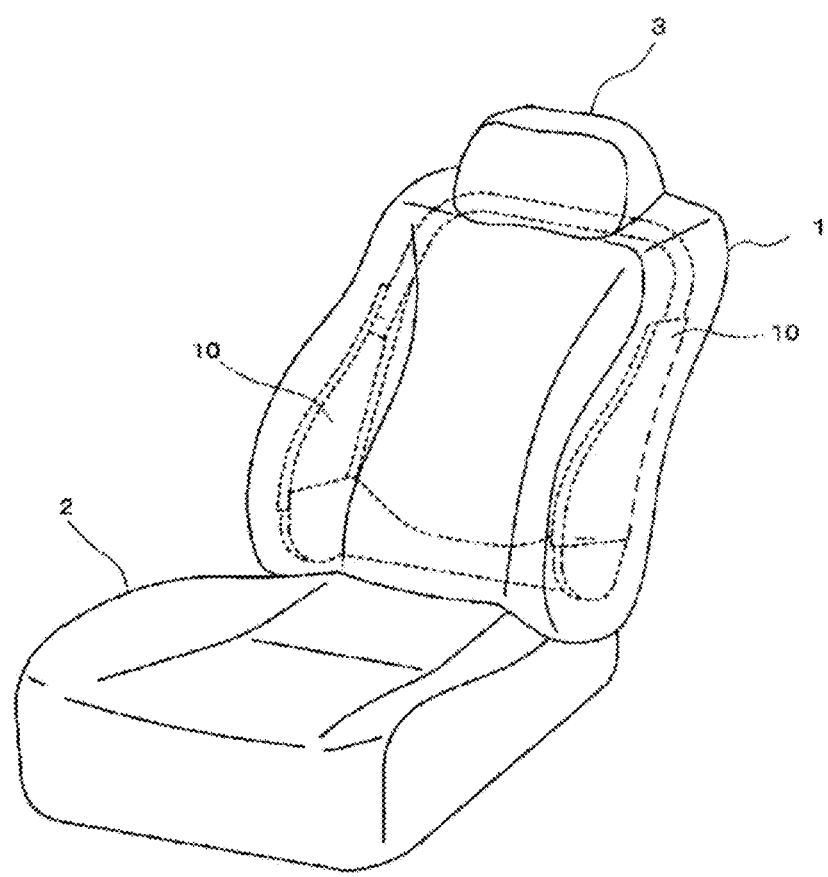
FIG. 1 is a perspective view primarily illustrating an external shape of a vehicle seat according to the present invention, with an illustration of a side airbag device omitted.
Figure 2:
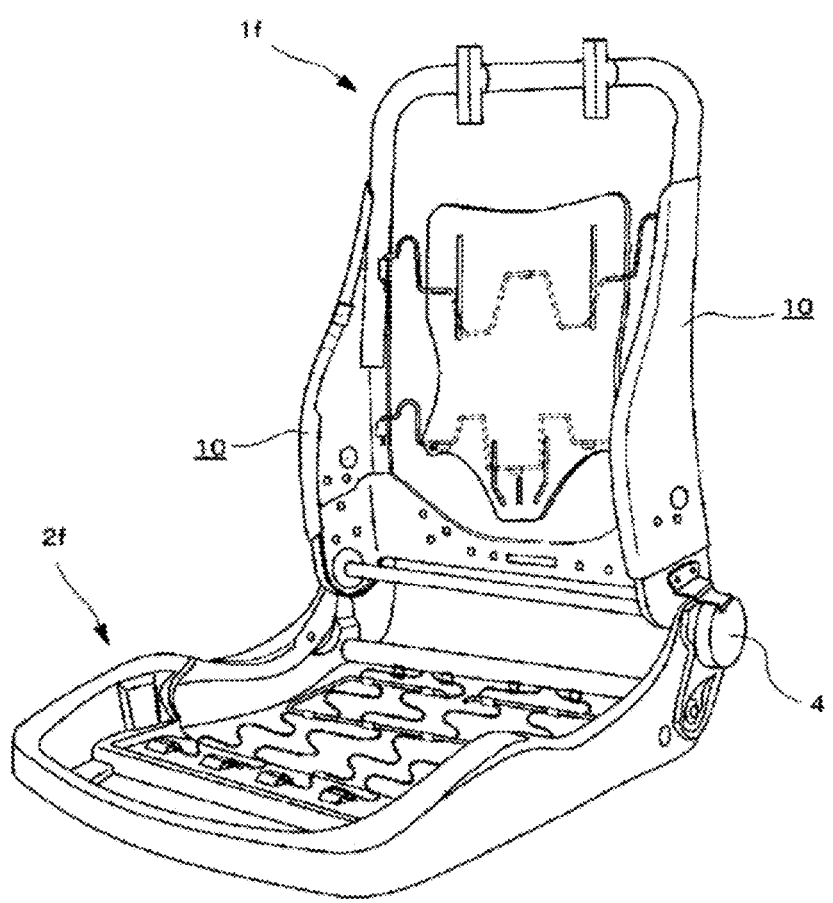
FIG. 2 is a perspective view illustrating an internal structure (seat frame) functioning as a framework of the vehicle seat illustrated in FIG. 1, with an illustration of the side airbag device omitted.

FIG. 1 is a perspective view primarily illustrating an external shape of a vehicle seat used as the vehicle seat according to the present invention, with an illustration of an airbag device (20) omitted. FIG. 2 is a perspective view illustrating an internal structure (seat frame) functioning as a framework of the vehicle seat illustrated in FIG. 1, with an illustration of the airbag device (20) also omitted herein. FIG. 3 is a schematic side surface view of the vehicle seat according to the present invention, illustrating a condition where the airbag device 20 is stored on a side surface (near side) near a left side seat door as observed from the outside in the vehicle width direction.

As illustrated in FIGS. 1 and 2, seen as the location, the vehicle seat according to the present example is configured by: a seat cushion 2 of a part on which an occupant is seated; a seat back 1 forming a backrest; and a headrest 3 connected to the upper end of the seat back 1.

As illustrated in FIG. 2, a seat back frame 1*f* forming a skeleton of the seat is provided inside the seat back 1, a pad 16 (refer to FIG. 4) made of a urethane foam material or the like is provided on a surface and periphery thereof, and a surface of the pad 16 is covered with a skin 14 such as leather, fabric, or the like. A seating frame 2*f* is provided on a bottom side of the seat cushion 2. Similar to the seat back 1, a pad made of a urethane foam material or the like is provided on an upper surface and periphery thereof, and a surface of the pad is covered by the skin 14 (FIG. 4) such as leather, fabric, or the like. The seating frame 2*f* and the seat back frame 1*f* are connected via a reclining mechanism 4.

As illustrated in FIG. 2, the seat back frame 1*f* is configured in a frame shape by: a side frame 10 arranged so as to be separated into the left and right and extending in a vertical direction; an upper frame connected to an upper end part of the side frame 10; and a lower frame connected to a lower end part thereof. A cushion member is provided outside a headrest frame to configure the headrest 3.

Figure 4:
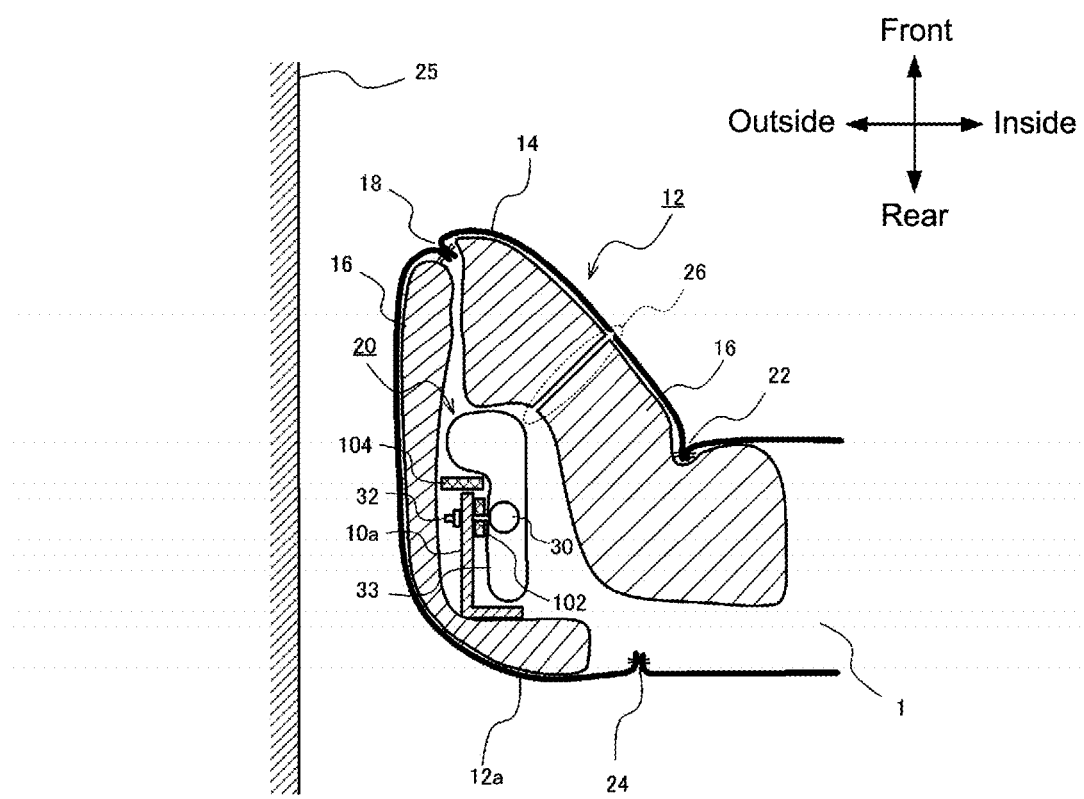
FIG. 4 is a cross sectional view illustrating the structure of the vehicle seat according to the present invention, corresponding to part of a cross section in an A1-A1 direction of FIG. 3.

FIG. 4 is a cross sectional view illustrating the structure of the vehicle seat according to the present invention, corresponding to a part of a cross section in an A1-A1 direction of FIG. 3. The side frame 10 can be molded of resin or metal and, as illustrated in FIG. 4, can be formed into an L-shaped cross sectional shape or a U-shaped cross sectional shape. The side frame 10 includes a frame side wall part 10a extending in the vehicle traveling direction when the horizontal cross section is seen from above. Furthermore, the airbag module (side airbag device) 20 is secured on an inner side (seat center side) of the frame side wall part 10a.

As illustrated in FIG. 4, the seat back 1 includes a side supporting part 12 which swells in the vehicle traveling direction (vehicle front) on a vehicle width direction side part (end part). A urethane pad 16 is arranged inside the side supporting part 12, and the side airbag device 20 is stored in a gap of the urethane pad 16. The side airbag device 20 includes: an airbag 33 that restrains an occupant when expanded and deployed; and an inflator 30 that supplies an expansion gas to the airbag 33.

Seams 18, 22, 24 of the skin 14 of the seat back 1 are interwoven and connected by sewing. Note that the front seam 18 is cleft when the airbag is deployed.

Furthermore, a start region 26 as a starting point when the side supporting part 12 bends towards the occupant side due to the expansion of a second chamber (36) (refer to FIG. 8 and FIG. 9) is formed in the side supporting part 12. The start region 26 can be any one of a notch, recess, or thin region, or combinations thereof. The start region 26 may be formed at only a urethane 16 part inside the side supporting part 12. Furthermore, the start region 26 can be omitted.

The airbag 33 may be covered by a soft cover (not illustrated in the drawings) made of fabric. The airbag 33 can appropriately use an appropriate compressing method other than folding into a bellows shape, or rolling ("folding" includes rolling). Details are described below. Note that in FIG. 4, reference code 25 indicates a door trim.

FIG. 5 illustrates a condition (A) where the side airbag device according to the present invention is stored as viewed from the rear, and a condition (B) as viewed from the outside. Note that in FIG. 5, the airbag 33 is illustrated using a dashed line, in order to clarify the shape and placement of the brackets 102, 104.

The airbag 33 in the stored condition is stored in the side supporting part 12 in a long and thin condition extending generally in the vertical direction. Furthermore, a lower part of the airbag 33 is folded a plurality of times upward in the longitudinal direction to form a lower compressed part 108. A long portion 106 positioned above the lower compressed part 108 is thinner than the lower compressed part 108 due to the number of folds being lower.

Herein, "vertical direction" not only includes an exactly vertical direction, but also a slightly inclined form along the side supporting part 12 or seat frame 10, as illustrated in FIG. 5(B).

As illustrated in FIG. 5, brackets (102, 104) are provided for securing the inflator 30 to the seat frame side wall part. The brackets (102, 104) are configured from a long plate part 104 extending in the vertical direction and an inflator retaining plate 102 directly secured to the seat frame side wall part 10a, through which two stud bolts 32a, 32b that are connected to the inflator 30 penetrate. Herein, the long plate part 104 and inflator retaining plate 102 are mutually connected by welding or the like.

Again, the airbag 33 includes the long portion 106 arranged along the long plate part 104 in a long and thin condition, and the lower compressed part 108 formed by the lower part of the airbag 33 protruding from a lower end of the long plate part 104.

The long plate part 104 has a first surface 104a facing the vehicle traveling direction, and in the stored condition, the airbag 33 (106) in a long and thin condition is disposed along the first surface 104a. In this case, when the long and thin compressed airbag 33 expands and deploys in the vehicle traveling direction, the first surface 104a of the long plate part 104 is a reaction force surface, and thus the airbag 33 reliably and quickly deploys in a forward direction.

Furthermore, the thin and long airbag 33 (106) is disposed along the long plate part 104. Therefore, the flexible airbag 33 does not unnecessarily bend, and thus posture and form of the airbag 33 in a stored condition is stabilized.

Furthermore, the lower compressed part 108 of the airbag 33 is formed using a portion that protrudes below the long plate part 104 (refer to FIG. 6). Therefore, when the airbag is actually deployed, the airbag deploys further downward than the long plate part 104, and thus the occupant can be restrained over a wider range in the vertical direction.

Figure 6A:
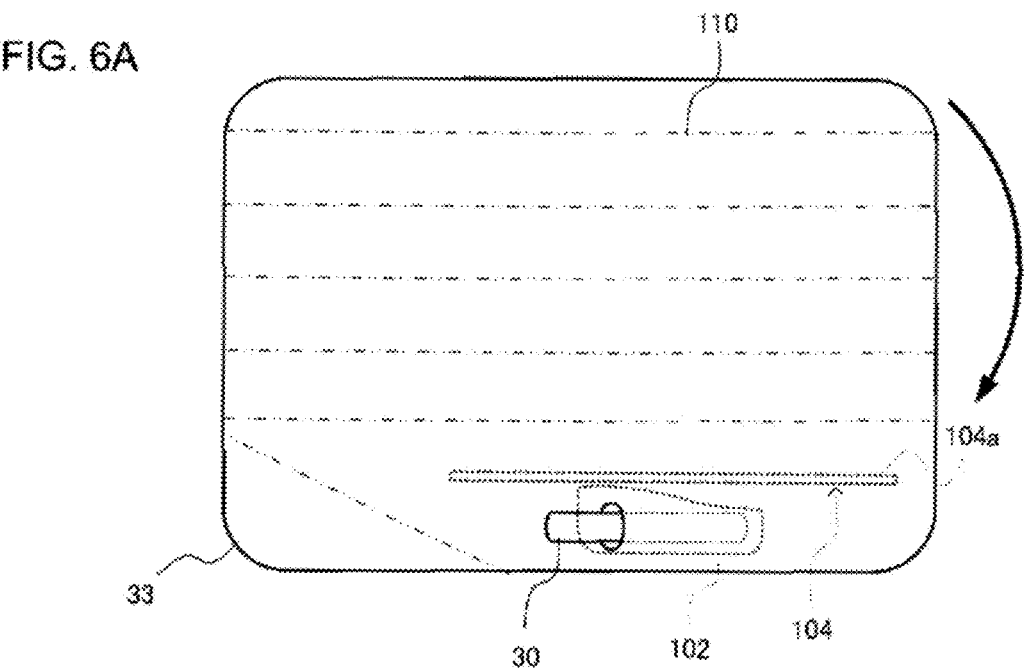
FIGS. 6(A), (B), and (C) are explanatory diagrams (plan views) illustrating a process of folding an airbag cushion of the side airbag device according to the present invention.
Figure 6B:
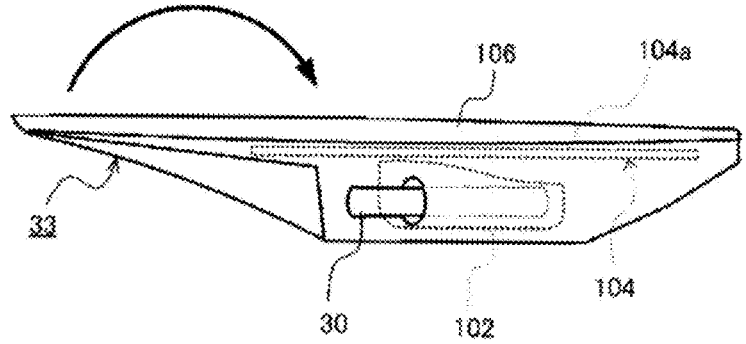

FIGS. 6(A), (B), and (C) are explanatory diagrams (plan views) illustrating a process of folding an airbag cushion 33 of the side airbag device according to the present invention. First, as illustrated in FIG. (A), the airbag 33 is compressed into a bellows shape or roll shape along line 110 from an open condition to form the long portion 106 of FIG. (B). Next, as illustrated in FIG. (C), the long portion 106 protruding from the long plate part 104 of the bracket is folded to the inflator 30 side (vertical direction) to form the lower compressed part 108.

Figure 6C:
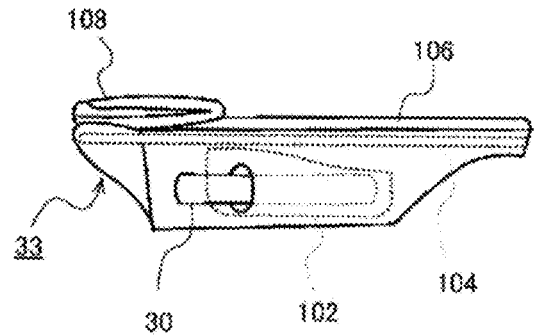

Thereafter, from the condition illustrated in FIG. 6(C), covering with a thin cover or fastening with breakable tape is possible in order to maintain the shape.

FIGS. 7(A), (B), (C), and (D) are schematic views illustrating folded forms of the lower compressed part 108. In an example illustrated in FIG. (A), the lower part of the airbag 33 in the folded (long and thin) condition is folded upwards into a bellows shape. In this case, in addition to the lower compressed part 108 being easy to form (fold), there is a merit where there is not a portion that gets caught when the lower compressed part 108 deploys, thereby enabling smooth deployment.

Next, in an example illustrated in FIG. 7(B), when the airbag 33 in the folded (long and thin) condition is viewed in the vehicle front-rear direction and on an extending cross section, the lower part of the folded airbag 33 is folded into a Z shape, a lower end part 108a of the airbag 33 is folded upward, and a tip end part is rolled and wrapped inside the Z-shaped fold. In this case, the Z-folded portion in the lower compressed part 108 first deploys downward, followed by deployment of the wrapped portion of the tip end 108a.

In an example illustrated in FIG. 7(C), when the airbag 33 in the folded (long and thin) condition is viewed in the vehicle front-rear direction and on an extending cross section, the lower part of the folded airbag 33 is folded into a Z shape, and the lower end part 108a is sandwiched (inserted) between a boundary portion to the first surface 104a of the long plate part 104. In this case, the Z-folded portion in the lower compressed part 108 first deploys downward, followed by deployment of the wrapped portion of the tip end 108a.

Finally, in an example illustrated in FIG. 7(D), when the airbag 33 in the folded (long and thin) condition is viewed in the vehicle front-rear direction and on an extending cross section, the lower part of the folded airbag 33 is folded into a Z shape, and the lower end part 108a is passed over a lower end of the long plate part 104 and wrapped around the surface on the back side of the first surface 104a of the long plate part 104. In this case, the Z-folded portion in the lower compressed part 108 first deploys downward, followed by deployment of the tip end portion 108a. With this method, the lowermost end 108a of the airbag 33 is wrapped around to a back side of the bracket 104 such that a thickness of a front portion of the airbag 33 can be reduced.

Figure 8:
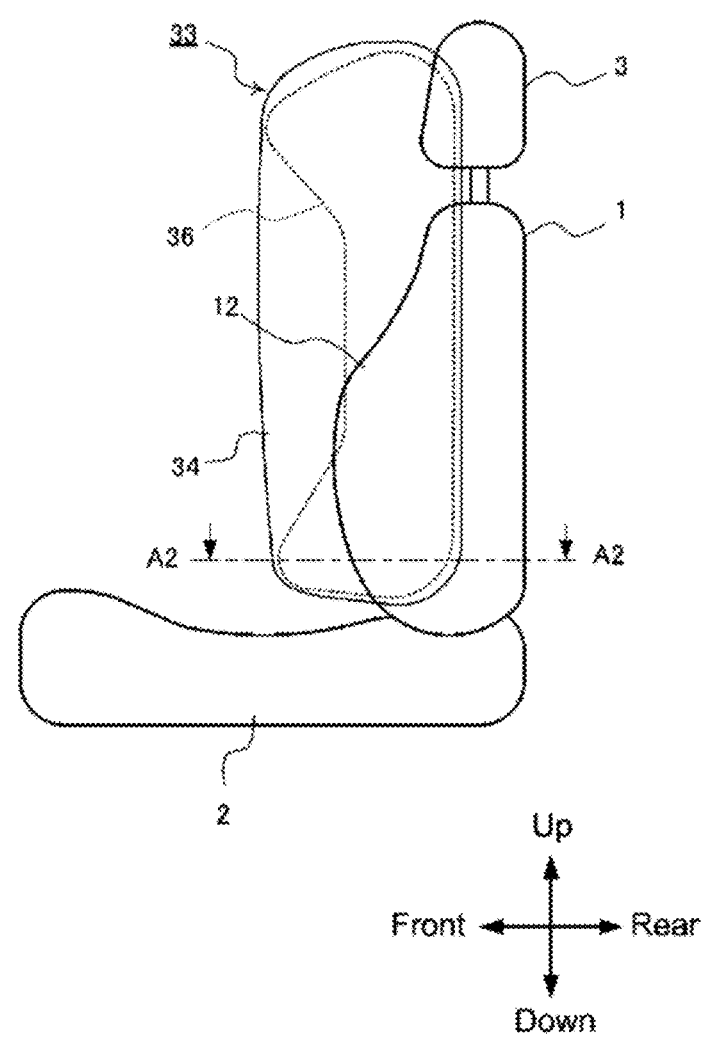
FIG. 8 is a schematic side surface view of the vehicle seat according to the present invention, illustrating a condition where the airbag is deployed as observed from the outside in the vehicle width direction.

FIG. 8 is a schematic side surface view of the vehicle seat according to the present invention, illustrating a condition where the airbag is deployed as observed from the outside in the vehicle width direction. As illustrated in FIG. 8, the airbag 33 includes: a first chamber 34 which is deployed towards the front of the side supporting part 12; and a second chamber 36 which is deployed inside in the vehicle width direction of the first chamber 34.

FIG. 9 illustrates a structure of the side airbag device according to the present invention. (A) is a schematic view illustrating a deployed condition of the airbag 33 corresponding to a cross section of FIG. 8 in an A2-A2 direction, and (B) is a front surface view illustrating the deployed condition of the airbag 33.

As described above, the airbag 33 is configured from: the first chamber 34 that deploys toward the front of the side supporting part 12 of the seat; and the second chamber 36 that stores the inflator 30 and begins to deploy prior to the first chamber 34 on the inside of the first chamber 34 in the vehicle width direction.

An internal vent hole V3 through which an expansion gas flows from the second chamber 36 into the first chamber 34 is provided at a partitioning part (boundary portion) of the first chamber 34 and second chamber 36. Note that in addition to the vent hole V3, an additional vent hole through which an expansion gas flows from the second chamber 36 into the first chamber 34 can be formed at the partitioning part (boundary portion) of the first chamber 34 and second chamber 36.

Exhaust vent V34 (V34a, V34b) for exhausting the gas to the outside is formed on a front end part of the first chamber 34. Note that at least one exhaust vent for exhausting the gas to the outside can be formed on a front end part of the second chamber 36, similar to the first chamber 34.

The second chamber 36 is deployed to overlap with the frame side wall part 10a as viewed from a side of the vehicle. In this case, deployment reliably occurs toward a center side of the seat in a condition where the frame side wall part 10a receives the reaction force during deployment of the second chamber 36. Even after deployment, pressure from the occupant can be received by the frame side wall part 10a, and thus the occupant can be reliably restrained in the seat center direction.

On the other hand, the first chamber 34 is deployed so as to not overlap with the frame side wall part as viewed from the side of the vehicle. Therefore, the first chamber 34 can be quickly and smoothly deployed without deployment being inhibited by the side frame 10 or second chamber 36.

The second chamber 36 can be demarcated into an upper region 36U, a lower region 36L, and an intermediate region 36M positioned between the upper region 36U lower region 36L. Herein, at least one of the upper region 36U and lower region 36L is configured to protrude and deploy more in the vehicle front direction than the intermediate region 36M. Note that in the example, both the upper region 36U and lower region 36L are configured to protrude and deploy more in the vehicle front direction than the intermediate region 36M, but only one may use a protruding form based on the shape or the like of the first chamber 34.

In the present example, the second chamber 36 can be C-shaped or U-shaped with an intermediate region facing rearwards, when viewed from the occupant side. When the airbag is deployed, the upper region 36U of the second chamber 36 is positioned in the vicinity of the head of the occupant, and thus can quickly restrain the head, which is prone to injury. Furthermore, the lower region 36L is positioned near the waist of the occupant and presses the waist, which is near the center of gravity of a human body. Therefore, the restraining performance of an occupant in an initial stage when an accident occurs can be improved.

The front end parts of the upper region 36U and lower region 36L of the second chamber 36 are formed to roughly match at a position of the front end part of the first chamber 34. In this case, the air bag containing the first chamber 34 and second chamber 36 has an integrated structure, which has an advantage where overall development shape is stable.

FIG. 10 is an explanatory diagram (cross sectional view) illustrating a deployed condition of the airbag device according to the present invention, where (A) illustrates an initial deployment condition, and (B) illustrates a late deployment condition. Note that in FIG. 10, for convenience of explanation, an illustration of the seat frame 10 and bracket 102, 104 is omitted.

Figure 10A:
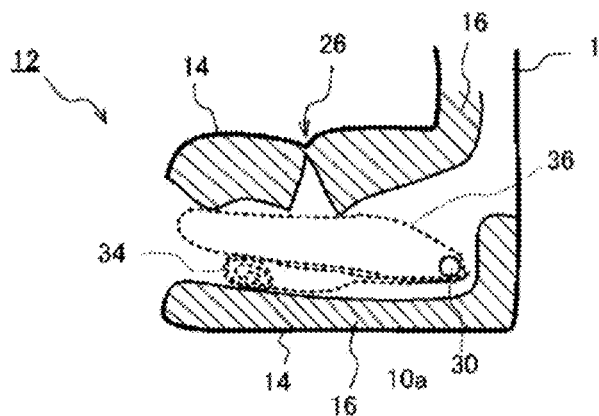
FIG. 10 is an explanatory diagram (cross sectional view) illustrating a deployed condition of the side airbag device according to the present invention, where (A) illustrates an early deployment condition, and (B) illustrates a later deployment condition.

In the present invention with the aforementioned configuration as illustrated in FIG. 10(A), the second chamber 36 deploys inside the side supporting part 12 in an initial activation stage of the airbag device 20, deforms such that a tip end side of the side supporting part 12 bends or protrudes on the vehicle side starting from the region 26 while the seat skin 14 tears from the sewn part 18, and restrains so as to push the occupant inward in the vehicle width direction.

A front side portion of the side supporting part 12 deforms protruding toward the occupant side due to the deployment of the second chamber 36. Therefore, generation of the force that pushes the opponent diagonally forward from a back direction can be avoided or minimized, and the movement of the occupant in a direction pulling a seatbelt out can be avoided. In other words, injury to the occupant can be suppressed, and restraining performance can be maximized.

Figure 10B:
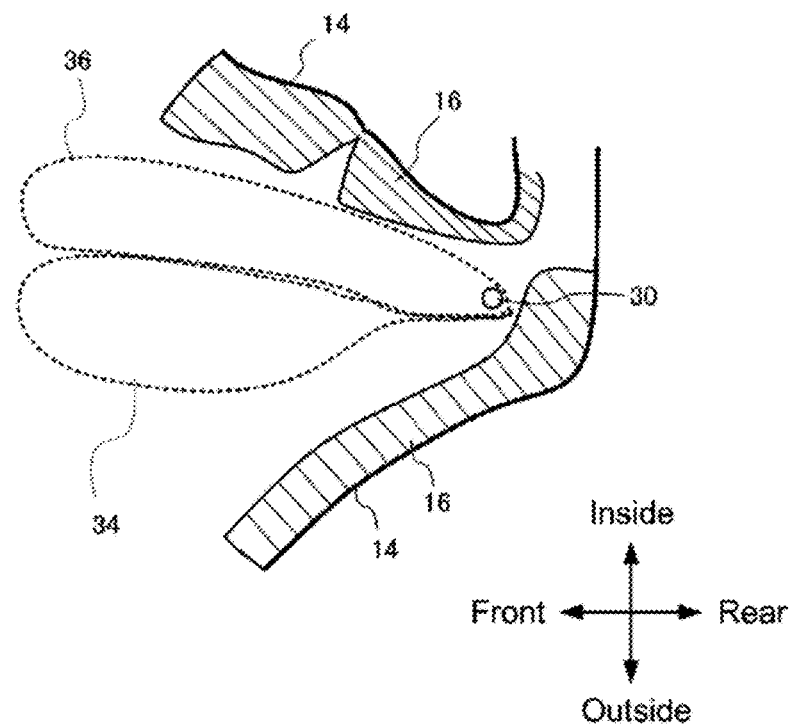

Subsequently, as illustrated FIG. 10(B), when the airbags (34, 36) further expand, the first chamber 34 fully deploys toward the front of the vehicle to protect the occupant in the event of a collision.

In the present invention, the second chamber 36 includes the upper region 36U protruding forward and the lower region 36L as illustrated in FIG. 8 and FIG. 9. Therefore, the head and waist of the occupant can be restrained at an early stage after the airbag device starts to activate. Furthermore, there is an advantage where the entire shape of the airbag can be secured in an early stage of deployment while minimizing an increase in capacity of the second chamber 36.

Figure 11A:
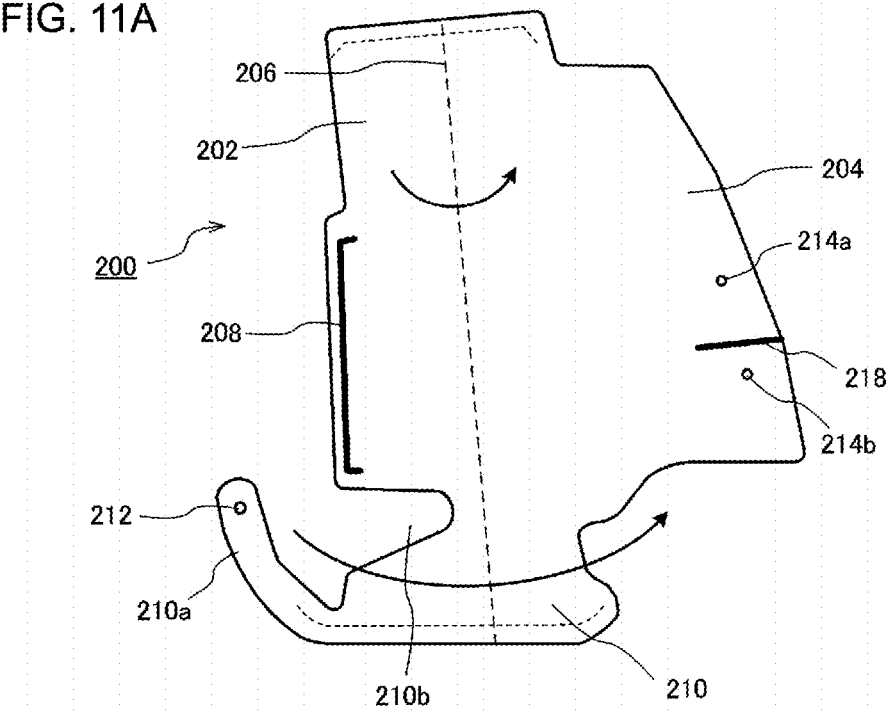
FIG. 11 is a plan view illustrating a structure of a soft cover that can be used in the side airbag device according to the present invention, where (A) illustrates an unfolded condition prior to assembly (sewing), and (B) illustrates a condition after sewing.
Figure 11B:
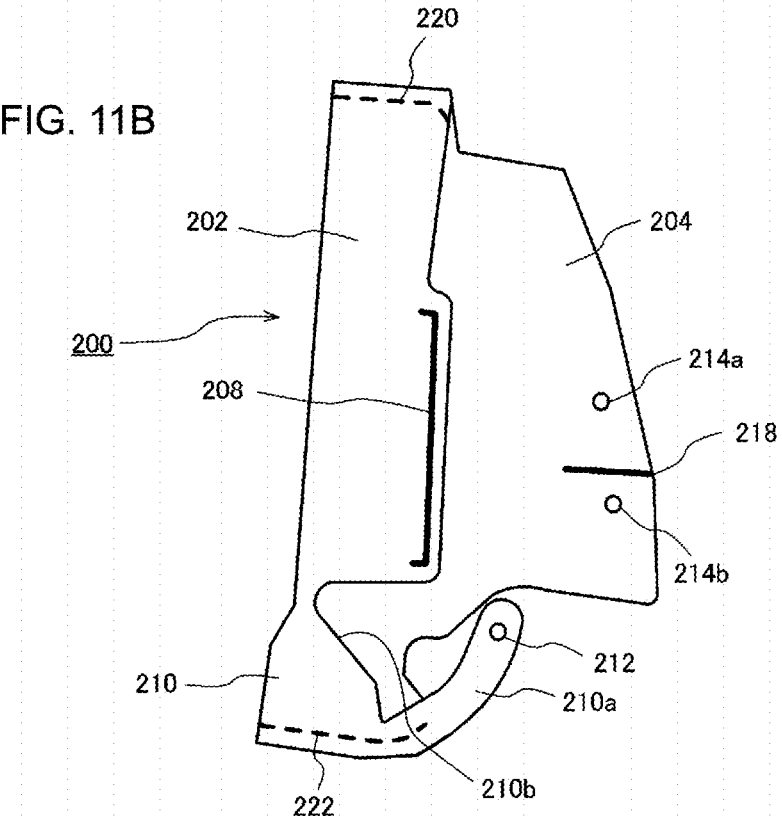

FIG. 11 is a plan view illustrating a structure of a soft cover that can be used in the side airbag device described above, where (A) illustrates an unfolded condition prior to assembly (sewing), and (B) illustrates a condition after sewing. The soft cover 200 encloses the airbag module containing airbags (34, 36), inflator 30, and brackets 102, 104 (refer to FIG. 6(C)). Unlike an airbag, the soft cover 200 is configured to not require a large amount of strength, in order to simply tear when the airbags (34, 36) deploy, and to not inhibit deployment of the airbags (34, 36).

The soft cover 200 is provided with: a first region 202 forming a bag-like a main compartment that stores the entire airbag module; a second region 204 that primarily covers the bracket (inflator retaining plate) 102, extending from the first region 202; and a lower region 210 positioned on a lower end of the first region 202 and that encloses the lower compressed part 108 that has a relatively large volume even within the folded airbag 33.

The first region 202 is folded back from a central fold 206 extending in the longitudinal direction to the second region 204 side, and an upper and a lower end of the folded first region 202 are sealed by stitches 220, 222 such that a bag-like main compartment (202) is formed (refer to FIG. B). A first slit 208 through which the bracket 102 penetrates is formed on an edge part of the first region 202.

Holes 214a, 214b for engaging with the two stud bolts 32a, 32b are formed in the second region 204. Furthermore, a second slit 218 is formed between the holes 214a and 214b.

The lower region 210 is provided with an arm-shaped region 210a protruding from an edge part. A hole 212 for engaging the stud bolt 32b is formed on a tip end part of the arm-shaped region 210a. Note that the first region 202 and lower region 210 are demarcated by a concave depressed notch part 210b on a center side (second region side). Due to the presence of the notch part 210b, the lower region 210 can relatively freely change orientation with regard to the first region 202, and thus the lower compressed part 108 of the folded airbag 33 can be appropriately enclosed.

Figure 12:
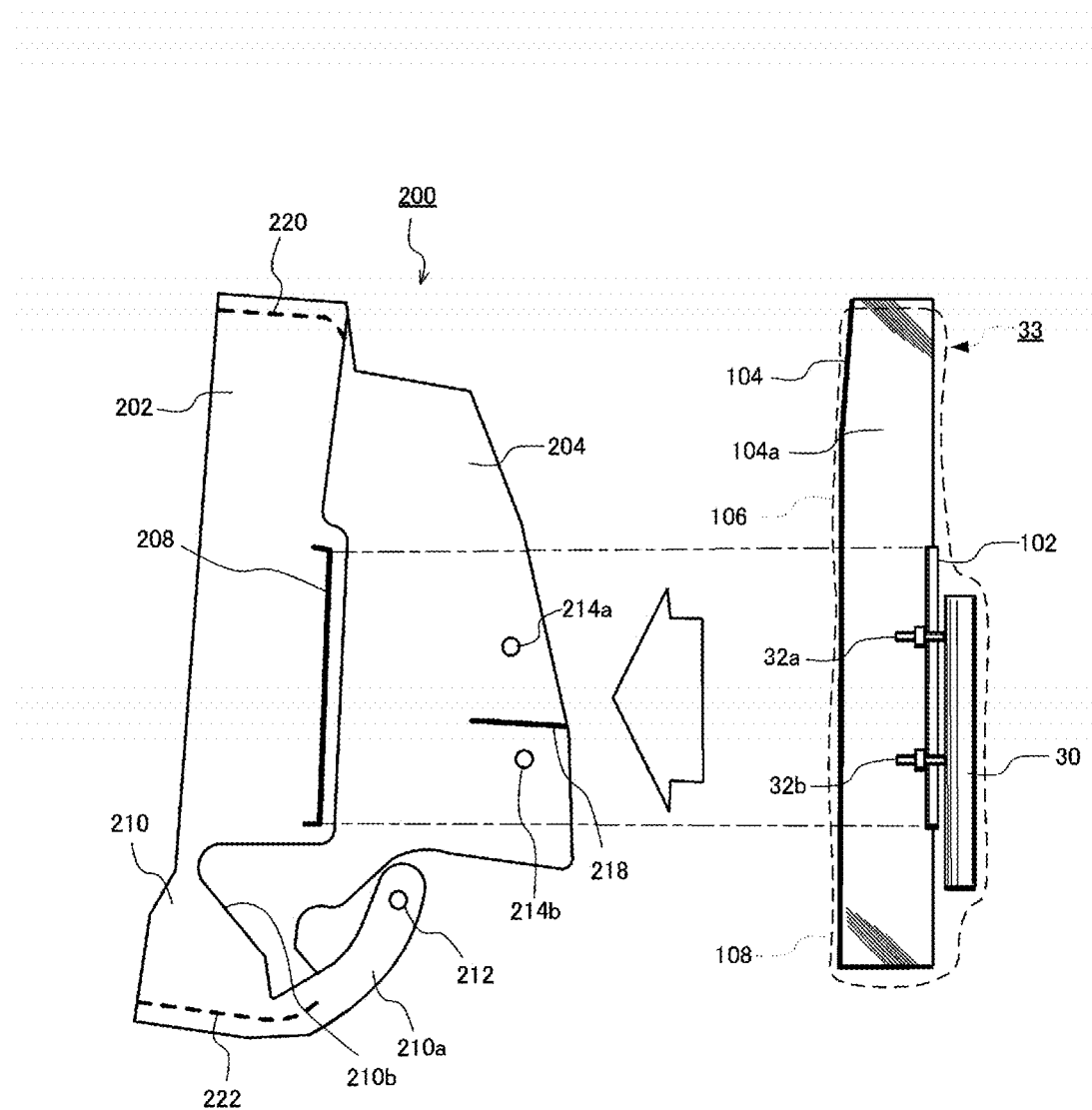
FIG. 12 is a plan view illustrating a condition where an airbag module is stored in the soft cover according to the present invention.
Figure 13:
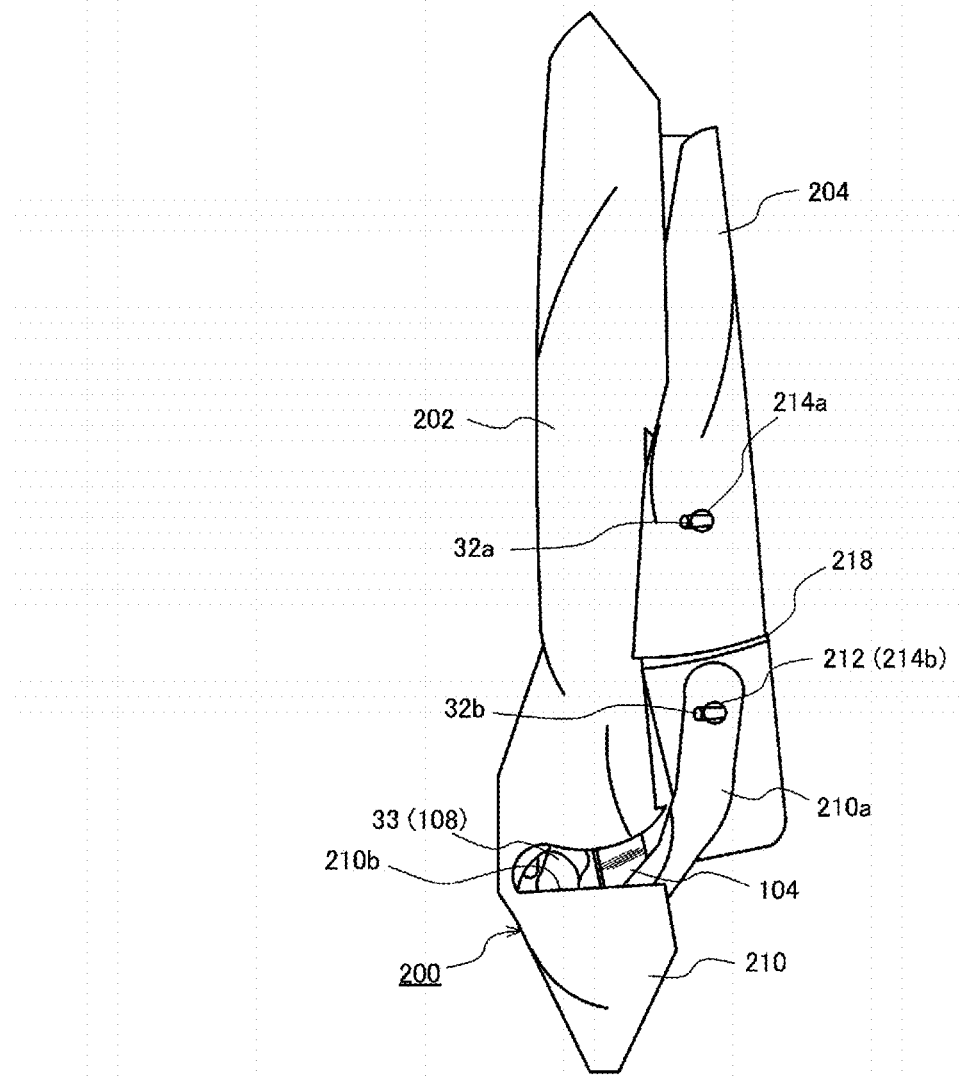
FIG. 13 is a schematic perspective view illustrating the airbag module enclosed in the soft cover according to the present invention.

FIG. 12 is a plan view illustrating a condition where an airbag module is stored in the soft cover 200 according to the present invention. FIG. 13 is a schematic perspective view illustrating the airbag module enclosed in the soft cover 200 according to the present invention. Note that FIG. 13 illustrates a condition that is rotated 90° from the condition in FIG. 12. A procedure for enclosing the airbag module by the soft cover 200 is described below.

First, as indicated by the arrow in FIG. 12, the entire airbag module is inserted and stored in the main compartment 202 of the soft cover 200, and the bracket 102 is passed through and exposed in the outward direction from the slit 208. Next, as illustrated in FIG. 13, the second region 204 is covered toward the main compartment 202 side, and the holes 214a, 214b are engaged with the stud bolts 32a, 32b. Then, the arm-shaped region 210a of the lower region 210 is pulled, and the hole 212 on the tip end of the arm-shaped region 210a is engaged with the stud bolt 32b on the lower side. At this time, the lower compressed part 108 of the airbag 33 is enclosed from below in a wrapping manner by the lower region 210 of the soft cover 200 with as little gap as possible.

In the present example, the lower compressed part 108 of the airbag 33 is enclosed by the lower region 210 of the soft cover 200 in a wrapping manner, such that the lower compressed part 108 is not displaced, and the storing shape does not collapse.

Furthermore, when the airbag module is viewed on a cross section orthogonal to the longitudinal direction, one overhanging bracket 102 is pulled out from the slit 208. Therefore, the soft cover 200 fits the entire airbag module with no extra space between the soft cover 200 and airbag module.

Figure 14:
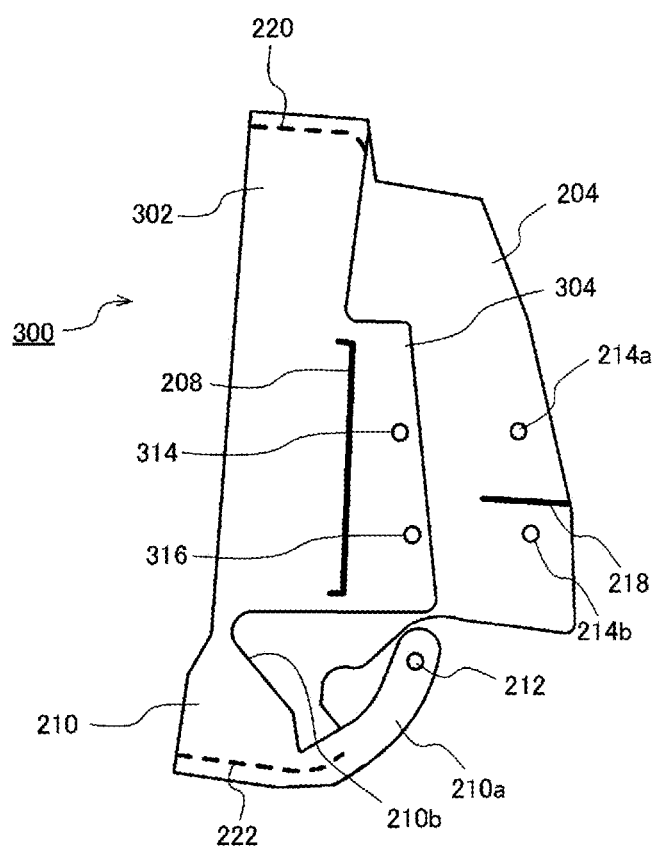
FIG. 14 is a plan view illustrating another example of a soft cover that can be applied to the side airbag device according to the present invention.

FIG. 14 is a plan view illustrating another example of a soft cover that can be applied to the side airbag device according to the present invention. Most of the structure illustrated in FIG. 14 is common to the structure illustrated in FIG. 11(B) and FIG. 12. Differing points include an open side edge part (right edge side in the drawing) of a first region 302 of a soft cover 300 that is pulled out, and holes 314, 316 for engaging to the stud bolts 32a, 32b are formed on an overhanging extended region 304. After the bracket 102 is exposed from the slit 208, the extended region 304 is folded back to the left side in the drawing, and the holes 314, 316 engage with the stud bolts 32a, 32b protruding from the bracket 102.

Figure 15:
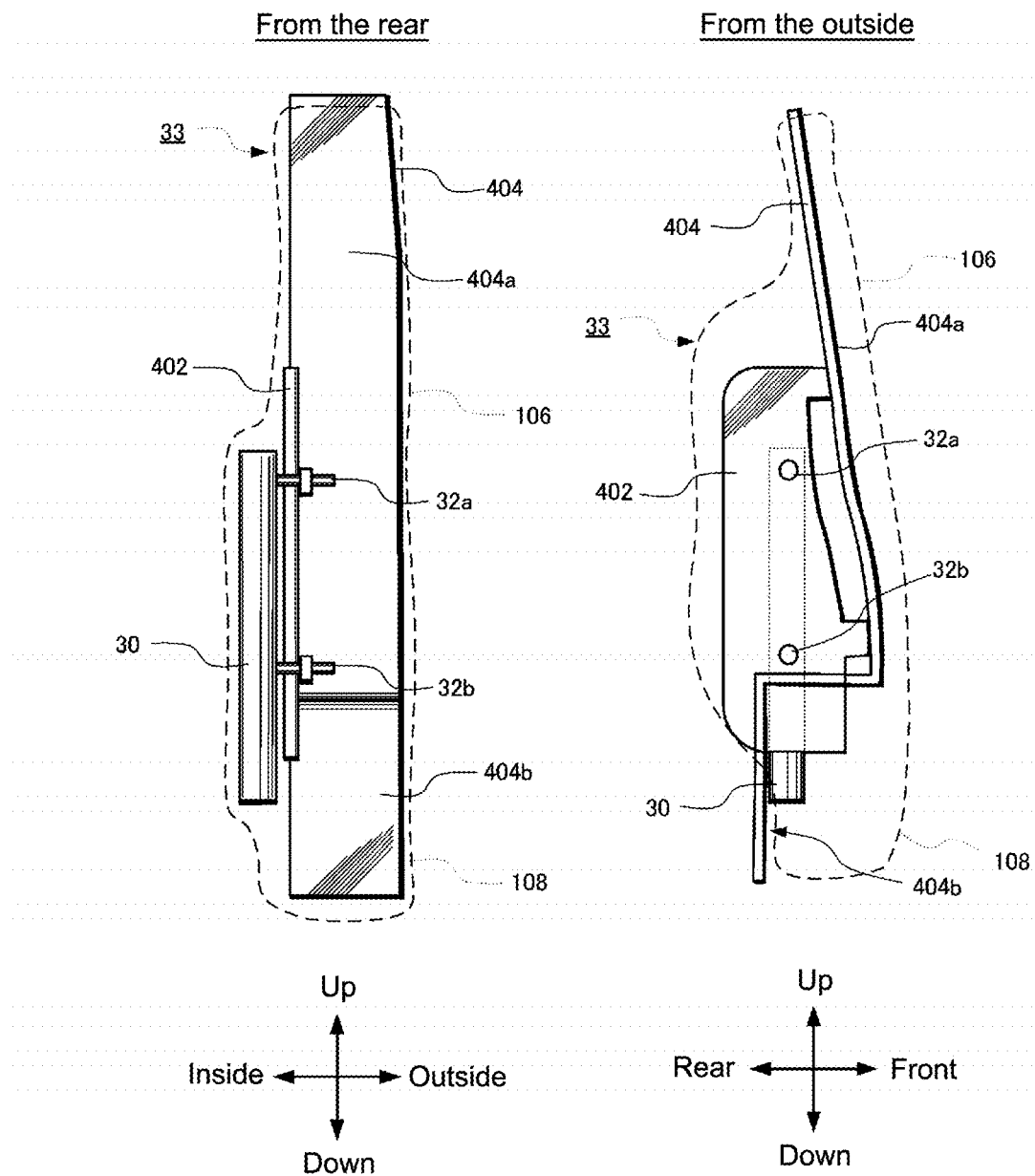
FIG. 15 illustrates a condition (A) where the side airbag device according to another example of the present invention is stored as viewed from the rear, and a condition (B) as viewed from the outside (door side) in a seat width direction, respectively.
Figure 16:
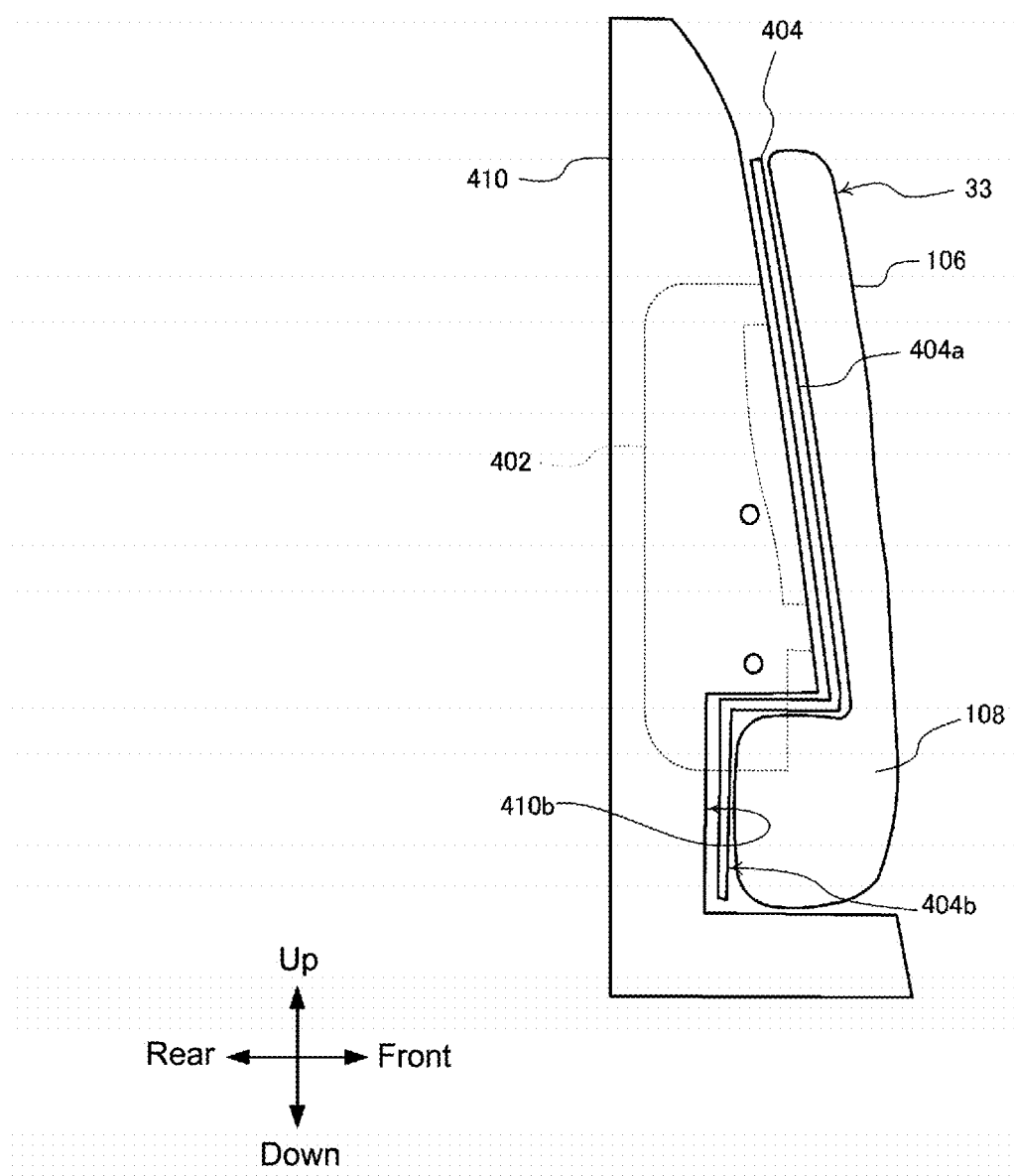
FIG. 16 is a side surface view illustrating the shape of a seat frame and a bracket of the side airbag device, in the example illustrated in FIG. 5.

FIG. 15 respectively illustrates a condition (A) where the side airbag device according to another example of the present invention is stored as viewed from the rear, and a condition (B) as viewed from the outside (door side) in a seat width direction. FIG. 16 is a side surface view illustrating the shape of a seat frame 410 and brackets 402, 404 of the side airbag device, in the example illustrated in FIG. 15, with an illustration of the inflator and the like omitted.

In the example illustrated in FIG. 15 and FIG. 16, a new structure is adopted for the shape of a seat frame 410 in addition to devising a shape of the brackets (402, 404) of the side airbag device. Note that in the following description, components identical or corresponding to those described above are labeled with identical symbols, with redundant descriptions thereof omitted.

In the present example, similar to the aforementioned example, the brackets (402, 404) for securing the inflator 30 to the seat frame side wall part 410 are configured from a long plate part 404 extending in the vertical direction and an inflator retaining plate 402 directly secured to the seat frame side wall part 410, through which two stud bolts 32a, 32b that are connected to the inflator 30 penetrate.

The long plate part 404 has a first surface 404a facing the vehicle traveling direction, and in the stored condition, the airbag 33 (106) in a long and thin condition is disposed along the first surface 404a. Furthermore, a recess 410b recessed into the seat frame 410 to accommodate the lower compressed part 108 of the airbag is formed in the vicinity of a lower end of the long plate part 404. Herein, the recess 410b can be formed by bending the lower end of the long plate part 104 rearward to form a step. Therefore, instead of a "recess", a "stepped part" may be used.

On the other hand, a U-shaped notched region 410b for receiving the recess 404b of the long plate part 404 is formed on the seat frame 410. Thereby, in the folded and stored condition, the airbag 33 has a long portion 106 positioned above that is provided along a first surface 404a of the long plate part 404, and the lower compressed part 108 with a large thickness stored in the recess 404b. At this time, a front surface of the airbag 33 is preferably configured to be generally flush.

In the present example as described above, the shapes of the long plate part 404 of the bracket and seat frame 410 can be devised such that the folded airbag 33 can be neatly retained and stored. Thus, the structure of the side supporting part 12 of the seat can be simplified, thereby reducing manufacturing cost. For example, the shape of the urethane pad 16 that encloses the airbag device can be simplified, thereby reducing the molding cost of the pad 16 itself and simplifying the process of installing the pad 16.

While the present invention has been described with reference to the abovementioned illustrative embodiments, many equivalent changes and variations will be obvious to those skilled in the art from the present disclosure. Therefore, the abovementioned illustrative embodiments of the present invention are presumably illustrative but not limiting. Without departing from the spirit and scope of the present invention, the described embodiments may take on various modifications. For example, while a side airbag on the near side has been predominantly mentioned in the Description of the Preferred Embodiment, use is also possible with a far side airbag (surface on the far side from a vehicle door of a vehicle seat), in very small vehicles such as a single seat vehicle (irrespective of the presence of a door, a vehicle including parts with only one seat in a single row), and the like.

The invention claimed is:

1. A side airbag device for a vehicle seat having a seat cushion forming a seat surface, a seat back forming a backrest, and a side supporting part, the side airbag device comprising:
    an airbag for storage inside the side supporting part in a stored condition; and
    an inflator for supplying expansion gas to the airbag to expand and deploy the airbag in response to a vehicle collision; wherein:
    the airbag is folded in the stored condition and has a longitudinal direction oriented vertically, and
    a lower part of the airbag in the stored condition is folded a plurality of times in the longitudinal direction to form a lower compressed part,
    wherein the lower compressed part is formed by further folding the lower part of the airbag into a bellows shape.

2. The side airbag device according to claim 1, further comprising a bracket for securing the inflator to a seat frame side wall part inside the side supporting part, wherein:
    the bracket includes a long plate part elongated vertically, and
    the airbag is disposed along the long plate part in the stored condition.

3. The side airbag device according to 2, wherein the long plate part has a first surface facing a vehicle traveling direction, and the side airbag in a folded condition is disposed along the first surface in a stored condition.

4. The side airbag device according to claim 2, wherein the bracket includes an inflator retaining plate directly securable to the seat frame side wall part, through which a stud bolt of the inflator penetrates, and the long plate part.

5. The side airbag device according to claim 1, wherein the airbag is provided with: a first chamber deployable toward a front of the side supporting part; and a second chamber storing the inflator and deployable prior to the first chamber on an inside of the first chamber in a vehicle width direction.

6. The side airbag device according to claim 1, further comprising a soft cover that contains a soft sheet-like material and encloses the airbag and the inflator.

7. The side airbag device according to claim 6, further comprising a bracket that secures the inflator to a seat frame side wall part inside the side supporting part,
    wherein the soft cover has a first slit through which a protruding portion of the bracket penetrates.

8. The side airbag device according to claim 7, wherein:
    the bracket includes a long plate part elongated vertically; and
    an inflator retaining plate directly securable to the seat frame side wall part, through which a stud bolt of the inflator penetrates, and the first slit is formed such that the inflator retaining plate can be penetrated.

9. The side airbag device according to claim 8, wherein the long plate part and the inflator retaining plate generally extend in an orthogonal direction, in a cross section in a direction orthogonal to the longitudinal direction of the long plate part.

10. The side airbag device according to claim 8, wherein the soft cover is provided with a bag-like compartment that stores the long plate part and airbag, and the first slit is formed in a portion of a main compartment.

11. The side airbag device according to claim 6, wherein two holes through which two stud bolts penetrate are formed in the soft cover, and a second slit is formed between the two holes.

12. A side airbag device for a vehicle seat having a seat cushion forming a seat surface, a seat back forming a backrest, and a side supporting part, the side airbag device comprising:
    an airbag for storage inside the side supporting part in a stored condition; and
    an inflator for supplying expansion gas to the airbag to expand and deploy the airbag in response to a vehicle collision; wherein:
    the airbag is folded in the stored condition and has a longitudinal direction oriented vertically, and
    a lower part of the airbag in the stored condition is folded a plurality of times in the longitudinal direction to form a lower compressed part, wherein the lower part is folded into a Z shape to form the lower compressed part.

13. The side airbag device according to claim 12, further comprising a bracket for securing the inflator to a seat frame side wall part inside the side supporting part, the bracket including a long plate part extending elongated vertically, the airbag is disposed along the long plate part in the stored condition,
    wherein a tip end part of a lower end of the airbag is sandwiched between a boundary portion between the long plate part and airbag in the stored condition.

14. The side airbag device according to claim 13, further comprising a bracket for securing the inflator to a seat frame side wall part inside the side supporting part, the bracket including a long plate part extending elongated vertically, the airbag is disposed along the long plate part in the stored condition,
    wherein a tip end portion of a lower end of the airbag is passed over a lower end of the long plate part and wrapping around a surface on a back side of the first surface of the long plate part when the airbag is in the stored condition.

15. The side airbag device to claim 12, wherein a lower end of the airbag is folded upward, and a tip end part is rolled and wrapped inside a Z-shaped fold when the airbag is in the stored condition.

16. A vehicle seat comprising:
    a seat cushion forming a seat surface;
    a seat back forming a backrest;
    a side supporting part;
    a seat frame inside the side supporting part; and
    a side airbag device secured to the seat frame in the side supporting part;
    wherein the side airbag device includes:
        an airbag for deployment forward from the side supporting part in an event of a vehicle collision;
        an inflator that supplies expansion gas to the airbag; and
        a bracket secured to the seat frame in a condition retaining the airbag,
    wherein the airbag is retained against the bracket in an extending condition such that a vertical direction is a longitudinal direction,
    a lower part of the airbag in a stored condition is folded a plurality of times in the longitudinal direction such that a lower compressed part that is thicker than other portions is formed, wherein the bracket is provided with a recess formed in an extending long shape, and recessed in a side of the seat frame to store the lower compressed part of the airbag, wherein a notched region that receives the recess of the bracket is formed on the seat frame, and wherein the airbag is disposed along the long plate part of the bracket in the stored condition, and is configured such that the lower compressed part is stored in the recess.

17. The vehicle seat according to claim 16, wherein the long plate part has a first surface facing a vehicle traveling direction, and at least an upper portion of the airbag in the stored condition is disposed along the first surface.

18. The vehicle seat according to claim 16, wherein the bracket includes an inflator retaining plate directly secured to the seat frame, through which a stud bolt of the inflator penetrates, and the long plate part.

19. The vehicle seat according to claim 18, wherein the long plate part and inflator retaining plate generally extend in an orthogonal direction, in a cross section in a direction orthogonal to the longitudinal direction of the long plate part.

\* \* \* \* \*